Nov. 16, 1965     W. STELZER     3,217,495
BRAKE PRESSURE PROPORTIONING VALVE
Filed Nov. 27, 1964
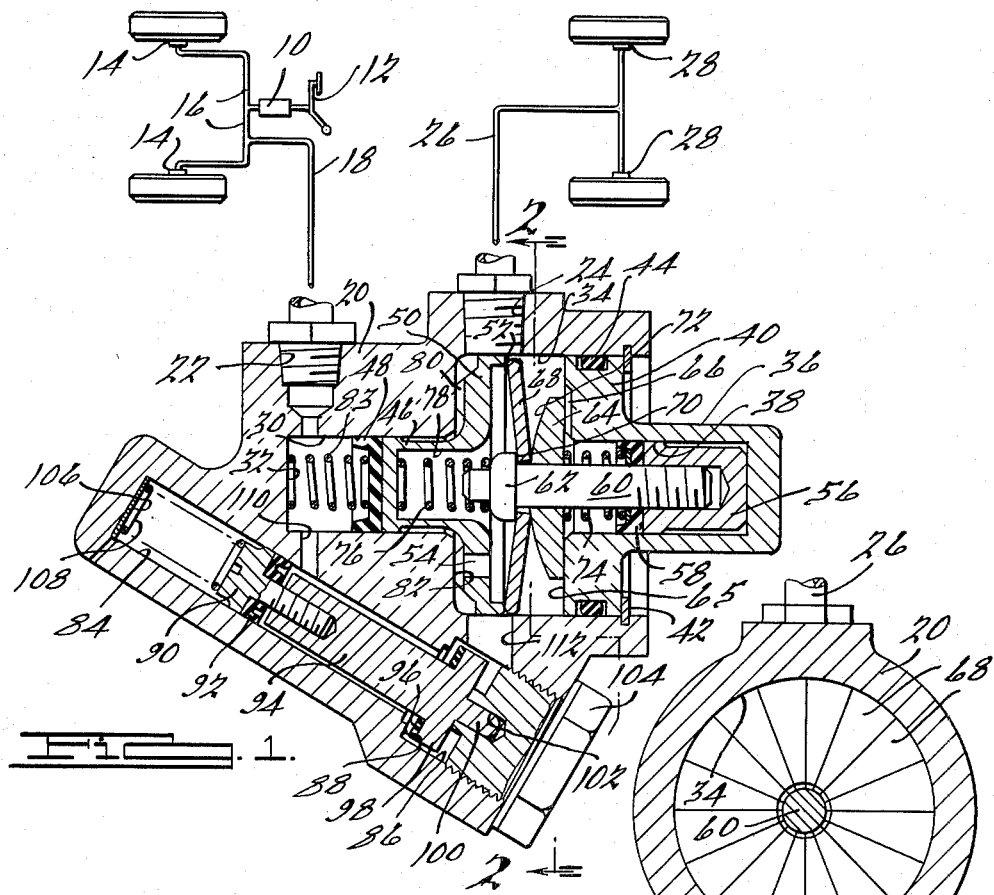
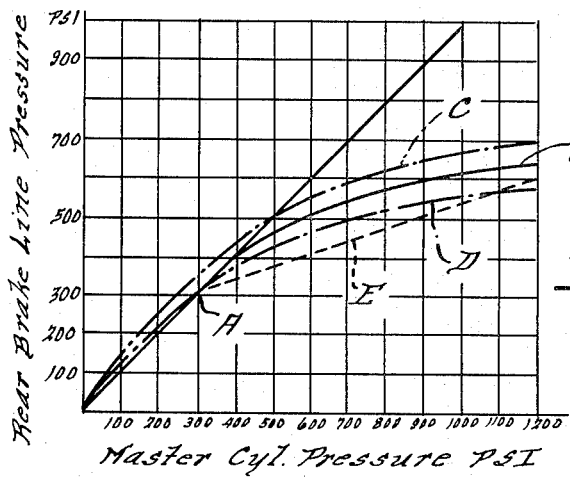
INVENTOR.
William Stelzer
BY
Harness, Dickey & Pierce
ATTORNEYS.

United States Patent Office 3,217,495
Patented Nov. 16, 1965

3,217,495
BRAKE PRESSURE PROPORTIONING VALVE
William Stelzer, Bloomfield Hills, Mich., assignor to Kelsey-Hayes Company, Romulus, Mich., a corporation of Delaware
Filed Nov. 27, 1964, Ser. No. 414,221
9 Claims. (Cl. 60—54.5)

This invention relates to hydraulic brake systems and particularly to a proportioning valve for a vehicle hydraulic brake system which is adapted to reduce the ratio of rear wheel brake pressure to fornt wheel brake pressure to compensate for the transfer of weight from the rear wheels to the front wheels of the vehicle during rapid deceleration.

The phenomenon of weight transfer in a vehicle during deceleration is well known in the automotive industry. During deceleration of a vehicle having two axles, a portion of the weight borne by the rear wheels is transferred to the front wheels. The greater the rate of deceleration the greater is the magnitude of the weight transfer. For this reason, the adhesion between the road and the rear wheels is decreased as the rate of deceleration is increased. Simultaneously, the adhesion between the road and the front wheels is increased. Accordingly, the braking efforts which may be applied to the front and rear wheels without producing skidding of such wheels are increased and decreased respectively, as the rate of deceleration is increased. Various devices have heretofore been proposed for varying the relative pressurization of the front and rear wheel brake cylinders during deceleration. Experience has indicated that the brake pressure produced by the master cylinder may be utilized as an approximate, but relatively reliable, indication of the rate of deceleration which is being experienced. While various prior devices have used the magnitude of master cylinder pressure as a guide to deceleration, the device of the present invention responds to master cylinder pressure in a novel and highly controlled manner.

It is an object of the present invention to provide a brake pressure proportioning device which gradually changes the ratio of rear brake cylinder pressure to front brake cylinder pressure during deceleration to more nearly approach the ideal ratio of such pressures than has been possible in prior devices of this type, thus enabling a utilization of the maximum adhesion between both front and rear wheels and the road and permitting a vehicle to be stopped within the shortest possible distance.

It is another object of the present invention to provide a brake pressure proportioning device of the above character which utilizes a small volume of pressurized fluid from the master cylinder to transmit a larger volume of fluid at a lower pressure to the rear brakes thereby maximizing the amount of fluid available to operate the rear brakes for a given fluid output of the master cylinder.

It is another object of the invention to provide a pressure proportioning device of the above character which is inexpensive to manufacture, reliable in operation, ruggedly constructed, and readily installed on a vehicle. These and other objects of the present invention will become apparent from the following detailed description taken in conjunction with the accompanying drawings, wherein:

FIGURE 1 is a section view of a proportioning device made in accordance with the present invention shown connected in a diagrammatically illustrated braking system;

FIGURE 2 is a sectional view of the structure illustrated in FIGURE 1 taken along the line 2—2 thereof; and FIGURE 3 is a graph of various braking pressures.

Referring now to the drawings, and particularly to FIGURE 1, there is illustrated a braking system including a master cylinder 10 operated by the customary brake pedal 12. The master cylinder 10 delivers fluid to front wheel brake cylinders 14 directly through lines 16. A brake line 18 is connected to one of the lines 16 and leads to the inlet opening 22 of housing 20, within which various parts of the pressure proportioning device of the present invention are enclosed. The housing 20 is also provided with an outlet opening 24, to which a line 26 is connected leading to rear wheel brake cylinders 28.

The housing 20 is machined to form a bore 30 which is closed by an end wall 32 at one end thereof and opens at its other end into an enlarged coaxial bore 34. The bore 34 is closed at its end opposite from the bore 30 by a member 36 having a bore 38 coaxial with the bores 30 and 34. The member 36 is provided with a radial flange 40 carrying an O-ring seal 42 sealing against the wall of the bore 34. The member 36 is held in place with its flange 40 disposed within the bore 34 by means of a retainer ring 42 connected to the housing 20. The member 36 is fabricated separately from the housing 20 merely for reasons of the exigencies of manufacture. In actual operation of the proportioning device, the member 36 may be considered as being an integral part of the housing 20.

The housing bore 30 serves to slidably receive a piston 46 carrying a lip seal 48 at its one end to prevent the passage of fluid thereby from the inlet opening 22 to the outlet opening 24. The piston 46 has an integral enlarged flange portion 50 disposed within the bore 34 and slidably contacting the wall of the bore 34. The flange 50 is provided with an annular shoulder 52 facing in a right-hand direction, as viewed in FIGURE 1, as well as with openings 54 assuring equal pressures on opposite sides thereof.

A second piston 56 is slidably supported within the bore 38 and carries a lip seal 58 at its left hand end (as viewed in FIG. 1) engaging the wall of the bore 38 to prevent the passage of fluid thereby. The piston 56 is secured to one end of an axially extending piston rod 60 projecting into the bore 34 and formed with a radial projection 62 spaced from the end thereof opposite piston 56. The piston rod 60 passes through a pivot block 64 which bears against the inner face 65 of the flange 40 and covers the end of the bore 38. However, fluid passage between the flange 40 and the pivot block 64 is permitted by means of slots 66 formed in the face 65 of the flange 40 adjacent the pivot block 64. The pivot block 64 forms a fulcrum for a plurality of levers 68 which are formed from flat sheet material cut to segmental shape and arranged in a side-by-side abutting relationship around the piston rod 60. The inner ends of the levers 68 engage an annular shoulder 70 formed on one side of the piston rod projection 62, while the radially outer ends of the levers 68 engage the annular shoulder 52 of the piston flange 50. The levers 68 contact the shoulders 52 and 70 on one side thereof and contact a convex surface 72 formed on the pivot block 64 on their opposite sides. A lightweight helical spring 74 disposed between the seal 58 and the pivot block 64 normally maintains the piston 56 in the position illustrated in the drawing. Similarly, a lightweight helical return spring 76 is disposed within a recess 78 of the piston 46 and is under compression between the piston rod projection 62 and the piston 46 normally to maintain the piston 46 in the position illustrated in the drawing. In this position, spaced projections 80 formed on the piston flange 50 contact an annular shoulder 82 formed in the housing 20 between the bores 30 and 34. A lightweight spring 83 keeps the seal 48 in contact with the piston 46 but is of insufficient strength to overcome the spring 76 and move the piston 46 from the position illustrated.

During light braking, the portion of the control device thus far described remains inoperative and the parts remain in the positions illustrated in the drawing. The pistons 46 and 56 are brought into play by the operation of a structure located within a pair of coaxial bores 84 and 86 formed in the housing 20 in a location offset from the bores 30, 34 and 38. The bore 84 will be seen to be of smaller diameter than the bore 86 into which it opens and a valve seat 88 is formed between these two bores. A piston 90 having a seal 92 is sealingly but slidably disposed within the bore 84 and is threadably connected to a valve member 94 having a seal 96 adapted to seat against valve seat 88. The valve member 94 is of smaller diameter than the bore 84, thereby leaving an annular space surrounding the valve member. The valve member 94 has an enlarged valve head 98 located within the bore 86 and against which the seal 96 is positioned. Additionally, the valve head 98 is provided with a guide portion 100 located within the guide opening 102 of a bore closure member 104 closing one end of the bore 86. The end of the bore 84 opposite from the bore 86 is closed by a housing wall 106. A spring 108 of a carefully selected rating is positioned between the end wall 106 and the piston 90 and normally keeps the valve seat 88 open. A passage 110 formed in the housing 20 provides fluid communication from the bore 30 to the bore 84 on the side of the seal 92 opposite from the spring 108. By this means fluid entering the bore 30 from the inlet 22 is free to flow through the passage 110 to the annular space between the valve member 94 and the bore 84. When the valve member 94 is open, fluid at a pressure developed by the master cylinder 10 is free to flow into the bore 86. From the bore 86 fluid is free to flow through a housing passage 112 leading from the bore 86 to the bore 34. From the bore 34 fluid is free to flow through the outlet 24 to the rear brake cylinders 28. Under such circumstances, the device provides an open system for the flow of fluid from the master cylinder directly to the rear brake cylinders 28 without any change in braking pressure. Thus the fluid pressure acting within the rear brake cylinders 28 will be equal to the fluid pressure in the front brake cylinders 14.

When the fluid pressure within the bore 84 acting against the piston 90 builds up to a predetermined level, the spring 108 will yield and the piston 90 will draw the valve seal 96 against its seat 88, thus closing communication between the passages 110 and 112. After the valve 94 has closed, further increases in fluid pressure within the bore 30, by operation of the master cylinder 10, will tend to move the piston 46 to the right. Before the valve 94 closed the pressure on opposite sides of the piston 46 was equal and it intended to remain at rest. Movement of the piston 46 as a result of increased pressure within the left-hand end of the bore 30 will displace fluid to the outlet 24. The movement of the piston 46 to the right will, of course, produce similar movement of its flange 50. Accordingly, the shoulder 52 formed on the outer end of the flange 50 moves the radially outer ends of the levers 68 to the right. The levers 68 fulcrum against the convex surface 72 of the pivot block 64 and react against the projection 62 of the piston rod 60, pulling the piston rod 60 to the left. This produces movement of the piston 56 to the left, causing it to work concurrently with the piston 46 in displacing fluid to the outlet 24. Thus, fluid from the master cylinder 10 acting against only the piston 46 produces fluid displacing movement of both the pistons 46 and 56. The actual amount of movement of the piston 56 for a given movement of the piston 46 depends entirely upon the point on the convex surface 72 at which the levers 68 fulcrum. This point constantly changes as the piston 46 moves to the right, the fulcruming point moving steadily radially outward. As the fulcrum point moves radially outwardly, an increased movement of the piston 56 for a given movement of the piston 46 will result. The result is a decreasing mechanical advantage requiring an ever greater force acting against the outer ends of the levers 68 to deliver a given force to the piston 56 for use in pressurizing fluid in the bores 34 and 38. The moving fulcrum point enables the piston 56 to displace an increased volume of fluid to the rear brake cylinders 28, but its ability to pressurize the rear brake cylinder fluid is decreased. The levers 68 and pivot block 64 may, therefore, be said to constitute variable mechanical advantage means operable to produce gradually greater movement of the piston 56 for a given movement of the piston 46 as piston 46 continues its fluid displacing movement. This results in a gradual lowering of the ratio of rear brake pressure to the front brake pressure as master cylinder pressure is increased, as indicated by the line B on the graph of FIGURE 3.

Turning now to the graph of FIGURE 3, point A on the graph represents the point of closure of the valve element 94. Line B, which continues from point A, indicates the rear brake pressure produced for a given master cylinder pressure as a result of the operation of the pistons 46 and 56. Line B is selected to lie between lines C and D which are the ideal rear brake pressures for a loaded and unloaded vehicle, respectively. It will be appreciated, of course, that the curvature of surface 72 which is selected controls the slope of line B.

In the event that the levers 68 and the pistons 46 and 56 should not be properly proportioned for a particular vehicle in which the valve is installed so that insufficient pressure would be transmitted to the rear brakes, then valve 94 will open to admit additional pressure to the rear brake cylinders 28 so that the brake pressure could never be worse than that represented by the line E of FIGURE 3. The line E of FIGURE 3 is the brake pressure produced by the action of the valve element 94 alone. Even if the pistons 46 and 56 failed to move it will be seen that the opening and closing of the valve 94 will cause rear brake cylinder pressure to be increased as master cylinder pressure is increased, although at a lesser rate than if the pistons 46 and 56 functioned as intended. This results from the fact that increasing master cylinder pressure acts against an annular area of the valve head 94 equal to the space between the diameter of the bore 84 and the mean diameter of the valve seat 88 against which the seal 96 seats. The force acting against this area is added to the force of the spring 100 to reopen the valve 94 and assure some pressure increase within the bores 86 and 34 as master cylinder pressure is increased.

It will be apparent that the present invention permits shaping of the pivot block surface 64 to tailor pressures which will be produced to the exact requirements of a particular vehicle and, thereby, establish any desired pressure curve. In other pressure proportion devices considerable compromises have had to be made between an ideal or desired braking curve and a curve which a device was capable of producing. No such compromise is necessary in the device of the present invention. Furthermore, it will be appreciated that there is no loss of fluid displaced to the rear brakes. The reduced pressure delivered to the rear brakes is reflected in a reduced volume of brake fluid from the master cylinder required to produce the desired rear brake pressure. Accordingly, the amount of travel of the brake pedal 12 is minimized.

It will be apparent that the spring 108 may be selected to cause the valve 94 to close at any desired level of master cylinder pressure. While this pressure is shown to be 300 p.s.i. in the illustrated embodiment of the invention, other pressures could be selected in accordance with the requirements of a particular vehicle and brake system.

While it will be apparent that the preferred embodiment herein illustrated is well calculated to fulfill the objects above stated, it will be appreciated that the invention is susceptible to modification, variation and change without departing from the proper scope or fair meaning of the subjoined claims.

What is claimed is:

1. A pressure proportioning device adapted to be interposed between the master cylinder and the rear brake cylinders of a vehicular hydraulic brake system including first and second pistons adapted to displace fluid concurrently to the rear brake cylinders, said first piston being arranged for actuation by fluid pressure from said master cylinder, variable force transmitting means operable to move said second piston in a direction displacing fluid to the rear brake cylinders in response to movement of said first piston, said means being effective to change the force which it delivers to said second piston in accordance with the extent of movement of at least one of said pistons.

2. A pressure proportioning device adapted to be interposed between the master cylinder and the rear brake cylinders of a vehicular hydraulic brake system including: first and second pitsons adapted to displace fluid concurrently to the rear brake cylinders, a lever operatively connected between said first and second pistons, a fulcrum member engageable by said lever, the locks of contact of said lever with said fulcrum member being changeable as said first and second pistons move relative to one another whereby the mechanical advantage with which force is transmitted between said pistons is changed and bypass means providing direct fluid communication from said master cylinder to said rear brake cylinders during a pretermined initial brake application, said bypass means being closable after said initial brake application, one of said pistons being exposed to master cylinder pressure at least after closure of said bypass for actuation thereby upon closure of said bypass.

3. A proportioning device adapted to be interposed between the master cylinder and the rear brake cylinders of a vehicular hydraulic brake system including first and second pistons adapted to displace fluid concurrently to the rear brake cylinders, said first piston being arranged for actuation by fluid from the master cylinder, a lever operatively connected between said first and second pistons for moving said second piston in response to movement of said first piston, a fulcrum member engageable by said lever in a location which constantly changes with fluid displacing movement of said first piston whereby said second piston will be moved a constantly greater amount for a given movement of said first piston with continued fluid displacing movement of said first piston.

4. The structure set forth in claim 2 including means rendering said first and second pistons inoperative during a predetermined initial pressurization of said rear brake.

5. A pressure proportioning device adapted to be interposed between the master cylinder and the rear brake cylinders of a vehicular hydraulic brake system including first and second pistons adapted to displace fluid concurrently to the rear brake cylinders, said first piston being exposed to fluid pressure from said master cylinder on one side thereof, bypass means providing fluid communication from said master cylinder to the space between said first and second pistons and to said rear brake cylinders, motion transmitting means operatively connected between said first and second pistons for moving said second piston in response to movement of said first piston, said motion transmitting means being automatically variable to effect a greater movement of said second piston for a given movement of said first piston with continued fluid displacing movement of said first piston, and means for closing said bypass after predetermined initial pressurization of said rear brake cylinders whereby pressurization of rear brake cylinders after said bypass is closed can only be accomplished by said first and second pistons.

6. A pressure proportioning device adapted to be interposed between a master cylinder and the rear brake cylinders of a vehicular hydraulic brake system including a housing having first and second bores, first and second pistons disposed in said first and second bores, respectively, and operable upon movement thereof toward one another to displace fluid concurrently to said rear brake cylinders, lever means connected between said first and second pistons and operable to cause movement of said second piston toward said first piston upon movement of said first piston towards said second piston, the operation of said lever means being automatically variable to change its mechanical advantage as said first piston continues to move toward said second piston, bypass means providing fluid communication from said master cylinder to the space between said first and second pistons and to said rear brake cylinders, and pressure responsive valve means for closing said bypass after master cylinder pressure has reached a predetermined level whereby pressurization of said rear brake cylinders after said valve means has closed is accomplished only by means of said first and second pistons.

7. A pressure proportioning device adapted to be interposed between the master cylinder and the rear brake cylinders of a vehicular hydraulic brake system including first and second pistons adapted to displace fluid concurrently to the rear brake cylinders, said first brake cylinder being arranged for actuation by fluid pressure from said master cylinder, a lever operatively connected between said first and second pistons for effecting movement of said second piston in response to movement of said first piston, a pivot block having a curved surface engageable by said lever and serving as a fulcrum for said lever, said lever being engageable with said curved surface at a constantly varying location as said first piston moves in displacing fluid to the rear brake cylinders whereby said second piston will be moved an increasing amount for a given movement of said first piston.

8. A pressure proportioning device adapted to be interposed between the master cylinder and the rear brake cylinders of a vehicular hydraulic brake system including first and second pistons adapted to displace fluid concurrently to the rear brake cylinders, said first piston being arranged for actuation by fluid pressure from said master cylinder, an annular shoulder carried by said first piston, a plurality of radially extending levers engageable with said flange at their radially outer ends, an annular shoulder carried by said second piston and engageable with the radially inner ends of said levers, a fixed pivot block having a convex surface engageable with said levers intermediate the ends thereof and serving as a fulcrum therefor, said levers being engageable with said pivot surface at constantly changing locations as said first piston moves in a fluid displacing direction whereby said second piston will be moved a constantly increasing amount for a given movement of said first piston.

9. The structure set forth in claim 8 including means for rendering said first and second pistons inoperative during predetermined initial pressurization of said rear brake cylinders.

No references cited.

JULIUS E. WEST, *Primary Examiner.*